(12) United States Patent
Bannon et al.

(10) Patent No.: US 11,403,069 B2
(45) Date of Patent: Aug. 2, 2022

(54) ACCELERATED MATHEMATICAL ENGINE

(71) Applicant: Tesla, Inc., Austin, TX (US)

(72) Inventors: Peter Joseph Bannon, Woodside, CA (US); Kevin Altair Hurd, Redwood City, CA (US); Emil Talpes, San Mateo, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/887,784

(22) Filed: May 29, 2020

(65) Prior Publication Data

US 2021/0048984 A1    Feb. 18, 2021

Related U.S. Application Data

(63) Continuation of application No. 15/710,433, filed on Sep. 20, 2017, now Pat. No. 10,671,349.

(Continued)

(51) Int. Cl.
*G06F 7/575* (2006.01)
*G06T 1/20* (2006.01)
(Continued)

(52) U.S. Cl.
CPC .............. *G06F 7/575* (2013.01); *G06F 7/50* (2013.01); *G06F 7/52* (2013.01); *G06F 7/5443* (2013.01); *G06F 15/80* (2013.01); *G06F 17/16* (2013.01); *G06N 3/0454* (2013.01); *G06N 3/063* (2013.01); *G06T 1/20* (2013.01)

(58) Field of Classification Search
CPC ... G06F 7/575; G06F 7/50; G06F 7/52; G06F 7/5443; G06F 15/80; G06F 17/16; G06N 3/0454; G06N 3/063; G06T 1/20
See application file for complete search history.

(56) References Cited

U.S. PATENT DOCUMENTS 5,239,636 A    8/1993    Fischer
5,267,185 A    11/1993   Akabane
(Continued)

FOREIGN PATENT DOCUMENTS

AU    2019261735 A1    6/2020
AU    2019201716 A1    10/2020
(Continued)

OTHER PUBLICATIONS

Author Unknown; "Booth's Multiplication Algorithm", Wikipedia, Version from May 30, 2017 (Year: 2017).*
(Continued)

*Primary Examiner* — Aaron W Carter
(74) *Attorney, Agent, or Firm* — Knobbe, Martens, Olson & Bear, LLP

(57) ABSTRACT

Various embodiments of the disclosure relate to an accelerated mathematical engine. In certain embodiments, the accelerated mathematical engine is applied to image processing such that convolution of an image is accelerated by using a two-dimensional matrix processor comprising subcircuits that include an ALU, output register and shadow register. This architecture supports a clocked, two-dimensional architecture in which image data and weights are multiplied in a synchronized manner to allow a large number of mathematical operations to be performed in parallel.

20 Claims, 10 Drawing Sheets

Related U.S. Application Data

(60) Provisional application No. 62/536,399, filed on Jul. 24, 2017.

(51) Int. Cl.

| | | |
|---|---|---|
| *G06F 15/80* | (2006.01) | |
| *G06F 7/52* | (2006.01) | |
| *G06F 7/50* | (2006.01) | |
| *G06N 3/063* | (2006.01) | |
| *G06N 3/04* | (2006.01) | |
| *G06F 7/544* | (2006.01) | |
| *G06F 17/16* | (2006.01) | |

(56) References Cited

U.S. PATENT DOCUMENTS

| | | |
|---|---|---|
| 5,311,459 A | 5/1994 | D'Luna et al. |
| 5,333,296 A | 7/1994 | Bouchard |
| 5,471,627 A | 11/1995 | Means et al. |
| 5,519,864 A | 5/1996 | Martell |
| 5,600,843 A | 2/1997 | Kato et al. |
| 5,717,947 A | 2/1998 | Gallup et al. |
| 5,742,782 A | 4/1998 | Ito |
| 5,850,530 A | 12/1998 | Chen |
| 5,887,183 A | 3/1999 | Agarwal et al. |
| 6,122,722 A | 9/2000 | Slavenburg |
| 6,195,674 B1 | 2/2001 | Elbourne |
| 6,446,190 B1 | 9/2002 | Barry |
| 6,882,755 B2 | 5/2005 | Silverstein et al. |
| 7,209,031 B2 | 4/2007 | Nakai et al. |
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,924,455 B1 | 12/2014 | Barman et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,697,463 B2 | 7/2017 | Ross |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,074,051 B2 | 9/2018 | Thorson |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,478 B2 | 11/2019 | Shalev |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tull et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |

(56) References Cited

U.S. PATENT DOCUMENTS

| | | |
|---|---|---|
| 10,671,082 B2 | 6/2020 | Huang et al. |
| 10,671,349 B2 | 6/2020 | Bannon et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,157,287 B2 * | 10/2021 | Talpes ................. G06F 13/1663 |
| 11,157,441 B2 * | 10/2021 | Talpes ................. G06N 3/0481 |
| 11,210,584 B2 * | 12/2021 | Brand ................... G06F 17/15 |
| 2002/0169942 A1 | 11/2002 | Sugimoto |
| 2003/0035481 A1 | 2/2003 | Hahm |
| 2005/0125369 A1 | 6/2005 | Buck et al. |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2007/0255903 A1 | 11/2007 | Tsadik |
| 2009/0016571 A1 | 1/2009 | Tijerina et al. |
| 2009/0192958 A1 | 7/2009 | Todorokihara |
| 2010/0017351 A1 | 1/2010 | Hench |
| 2010/0118157 A1 | 5/2010 | Kameyama |
| 2011/0029471 A1 | 2/2011 | Chakradhar et al. |
| 2011/0239032 A1 | 9/2011 | Kato et al. |
| 2012/0017066 A1 | 1/2012 | Vorbach et al. |
| 2012/0109915 A1 | 5/2012 | Kamekawa |
| 2012/0110491 A1 | 5/2012 | Cheung |
| 2012/0134595 A1 | 5/2012 | Fonseca et al. |
| 2012/0323832 A1 | 12/2012 | Snook et al. |
| 2013/0159665 A1 | 6/2013 | Kashyap |
| 2014/0046995 A1 | 2/2014 | Ranous |
| 2014/0089232 A1 | 3/2014 | Buibas et al. |
| 2014/0142929 A1 | 5/2014 | Seide et al. |
| 2014/0180989 A1 | 6/2014 | Krizhevsky et al. |
| 2014/0277718 A1 | 9/2014 | Tzhikevich et al. |
| 2014/0351190 A1 | 11/2014 | Levin et al. |
| 2015/0046332 A1 | 2/2015 | Adjaoute |

(56) References Cited

U.S. PATENT DOCUMENTS

| | | |
|---|---|---|
| 2015/0104102 A1 | 4/2015 | Carreira et al. |
| 2015/0199272 A1 | 7/2015 | Goel |
| 2015/0331832 A1 | 11/2015 | Minoya |
| 2016/0085721 A1 | 3/2016 | Abali |
| 2016/0132786 A1 | 5/2016 | Balan et al. |
| 2016/0328856 A1 | 11/2016 | Mannino et al. |
| 2016/0342889 A1 | 11/2016 | Thorson et al. |
| 2016/0342890 A1 | 11/2016 | Young |
| 2016/0342891 A1 | 11/2016 | Ross |
| 2016/0342892 A1 | 11/2016 | Ross |
| 2016/0342893 A1 | 11/2016 | Ross et al. |
| 2016/0364334 A1 | 12/2016 | Asaro |
| 2016/0379109 A1 | 12/2016 | Chung et al. |
| 2017/0011281 A1 | 1/2017 | Dihkman et al. |
| 2017/0052785 A1 | 2/2017 | Uliel |
| 2017/0060811 A1 | 3/2017 | Yang |
| 2017/0097884 A1* | 4/2017 | Werner .................. G06F 12/023 |
| 2017/0103298 A1 | 4/2017 | Ling |
| 2017/0103299 A1 | 4/2017 | Aydonat |
| 2017/0103313 A1 | 4/2017 | Ross et al. |
| 2017/0103318 A1 | 4/2017 | Ross |
| 2017/0158134 A1 | 6/2017 | Shigemura |
| 2017/0193360 A1 | 7/2017 | Gao |
| 2017/0206434 A1 | 7/2017 | Nariyambut et al. |
| 2017/0277537 A1 | 9/2017 | Grocutt |
| 2017/0277658 A1* | 9/2017 | Pratas .................... G06F 17/153 |
| 2018/0012411 A1 | 1/2018 | Richey et al. |
| 2018/0018590 A1 | 1/2018 | Szeto et al. |
| 2018/0032857 A1 | 2/2018 | Lele |
| 2018/0039853 A1 | 2/2018 | Liu et al. |
| 2018/0046900 A1 | 2/2018 | Dally |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0107484 A1 | 4/2018 | Sebexen |
| 2018/0121762 A1 | 5/2018 | Han et al. |
| 2018/0150081 A1 | 5/2018 | Gross et al. |
| 2018/0157961 A1* | 6/2018 | Henry ...................... G06N 3/04 |
| 2018/0157962 A1 | 6/2018 | Henry |
| 2018/0157966 A1 | 6/2018 | Henry |
| 2018/0189633 A1 | 7/2018 | Henry |
| 2018/0189639 A1 | 7/2018 | Henry |
| 2018/0189640 A1 | 7/2018 | Henry |
| 2018/0189649 A1 | 7/2018 | Naranyan |
| 2018/0189651 A1 | 7/2018 | Henry |
| 2018/0197067 A1 | 7/2018 | Mody |
| 2018/0211403 A1 | 7/2018 | Hotson et al. |
| 2018/0218260 A1* | 8/2018 | Brand ..................... G06F 17/15 |
| 2018/0247180 A1 | 8/2018 | Cheng |
| 2018/0260220 A1 | 9/2018 | Lacy |
| 2018/0307438 A1 | 10/2018 | Huang |
| 2018/0307783 A1* | 10/2018 | Hah ........................ G06F 30/34 |
| 2018/0308012 A1 | 10/2018 | Mummadi et al. |
| 2018/0314878 A1 | 11/2018 | Lee et al. |
| 2018/0315153 A1 | 11/2018 | Park |
| 2018/0336164 A1 | 11/2018 | Phelps |
| 2018/0357511 A1 | 12/2018 | Misra et al. |
| 2018/0374105 A1 | 12/2018 | Azout et al. |
| 2019/0011551 A1 | 1/2019 | Yamamoto |
| 2019/0023277 A1 | 1/2019 | Roger et al. |
| 2019/0025773 A1 | 1/2019 | Yang et al. |
| 2019/0026078 A1 | 1/2019 | Bannon |
| 2019/0026237 A1 | 1/2019 | Talpes |
| 2019/0026249 A1 | 1/2019 | Talpes |
| 2019/0026250 A1 | 1/2019 | Das Sarma |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0088948 A1 | 3/2019 | Rasale |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0179870 A1* | 6/2019 | Bannon .................. G06F 7/5443 |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0235866 A1* | 8/2019 | Das Sarma ............. G06F 17/16 |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311253 A1 | 10/2019 | Chung |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370645 A1 | 12/2019 | Lee |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |

(56) References Cited

U.S. PATENT DOCUMENTS

| | | |
|---|---|---|
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034148 A1* | 1/2020 | Sumbul ............... G06F 9/30141 |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahur et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |

(56) References Cited

U.S. PATENT DOCUMENTS

| | | |
|---|---|---|
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0048984 A1* | 2/2021 | Bannon ............... G06F 7/5443 |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2022/0050806 A1 | 2/2022 | Talpes |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |

(56) References Cited

FOREIGN PATENT DOCUMENTS

| | | |
|---|---|---|
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130621 A1 | 6/2020 |
| DE | 102019008316 A1 | 8/2020 |
| EP | 0 422 348 | 4/1991 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 04-295953 | 10/1992 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2010-079840 | 4/2010 |
| JP | 2015004922 A | 1/2015 |
| JP | 2015-056124 | 3/2015 |
| JP | 5863536 B2 | 2/2016 |
| JP | 6044134 B2 | 12/2016 |
| JP | 2017-027149 | 2/2017 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO-9410638 A1 * | 5/1994 ......... G06F 9/30036 |
| WO | WO 02/052835 | 7/2002 |
| WO | WO 14/025765 | 2/2014 |
| WO | WO 16/032398 | 3/2016 |
| WO | WO 16/048108 | 3/2016 |
| WO | WO 16/099779 | 6/2016 |
| WO | WO 16/186811 | 11/2016 |
| WO | WO 16/186823 | 11/2016 |
| WO | WO 16/207875 | 12/2016 |
| WO | WO 17/117186 | 7/2017 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |

(56) References Cited

FOREIGN PATENT DOCUMENTS

| WO | WO 20/131140 | 6/2020 |
|---|---|---|
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

OTHER PUBLICATIONS

Author Unknown, "Accumulator (computing)", Wikipedia, Version from Jul. 14, 2017 (Year: 2017).
Cornu, Thierry; Ienne, Paolo; Niebur, Dagmar; Thiran, Patrick; Viredaz, Marc A., "Design,mplementation, and Test of a Multi-Model Systolic Neural-Network Accelerator", Scientific Programming-Parallel:;omputing Projects of the Swiss Priority Programme, vol. 5, No. 1, Jan. 1, 1996, (14 pgs).
Kim, Sang Kyun; McMahon, Peter L.; Olukotun, Kunle, "A Large-scale Architecture for Restricted Boltzmann Machines", Department of Electrical Engineering Stanford University, 2010 18th IEEE Annual International Symposium on, IEEE, Piscataway, NJ, USA, May 2, 2010, (8 pgs).
Krizhevsky, Alex; Sutskever, Ilya; Hinton Geoffrey E.; "ImageNet Classification with Deep:;onvolutional Neural Networks", The 26th annual conference on Neural Information Processing Systems: Dec. 3-8, 2012. Available from Internet, <http://papers.nips.cc/book/advances-in-neural-information-processing-,ystems-25-2012>, (9 pgs).
Kung S: "VLSI Array processors", IEEE ASSP Magazine, IEEE. US, vol. 2, No. 3, Jul. 1985 (1 pg).
Sato, Kaz; Young, Cliff; Patterson, David "An in-depth look at Google's first ensor Processing Unit (TPU)", posted in Google Cloud Big Data And MACHINEcEARNING Blog, posting dale May 12, 2017. Available from Internet, <URL: https://cloud.google.com/blog/big-data/>, (22 pgs).
International Search Report and Written Opinion dated Oct. 1, 2018, in International Patent Application No. PCT/US18/42959.
International Search Report and Written Opinion dated Sep. 10, 2018 in application No. PCT/US18/38618.
Jouppi et al., Jun. 26, 2017, In-datacenter performance analysis of a tensor processing unit, 44th International symposium on Computer Architecture IKSCA), Toronto, Canada, 28 pp.
Oxford Dictionary, Definition of synchronize, retrieved Sep. 12, 2020, https://www/lexico.com/en/definition/synchronize.

* cited by examiner

ACCELERATED MATHEMATICAL ENGINE

CROSS-REFERENCE TO RELATED APPLICATION

This application is a continuation of, and claims priority to, U.S. patent application Ser. No. 15/710,433 titled "ACCELERATED MATHEMATICAL ENGINE" and filed on Sep. 20, 2017. U.S. Patent App. No. 15/710,433 claims the priority benefit under 35 USC § 119(e) to U.S. Prov. Pat. App. Ser. No. 62/536,399, filed on Jul. 24, 2017, entitled "Accelerated Mathematical Engine," and listing Peter Joseph Bannon, Kevin Altair Hurd, and Emil Talpes as inventors. Each of the above recited applications is hereby incorporated herein by reference in its entirety and for all purposes.

BACKGROUND

A. Technical Field

The present disclosure relates to an accelerated mathematical engine for operating on large amounts of data, and more particularly, to an accelerated mathematical engine for performing complex convolution operations based on matrix multiply operations.

B. Description of the Related Art

One skilled in the art will recognize the ever-increasing demands of speed and performance on general processors and systems that are used to implement time-sensitive and complex mathematical operations. As these general systems are used to process large amounts of data and perform complex mathematical operations, the computational resources and the rate of calculations are limited by the capabilities of existing general hardware designs that perform those calculations. For example, general-purpose computing devices and processors that execute matrix operations may be unable to perform these operations in a timely manner under certain circumstances. Many conventional multipliers that perform digital signal processing operations rely on a series of software and hardware matrix manipulation steps (address generation, transpositions, bit-by-bit addition and shifting, etc.) and may represent a bottleneck within a time-sensitive system. Oftentimes, these manipulation steps require the use of a processor's arithmetic functions to generate intermediate results at the expense of wasting computing time due to the added steps of storing and fetching intermediate results from various locations to complete an operation.

FIG. 1 shows an example of a conventional multiplier system. Multiplier system 100 is a scalar machine that comprises computation unit 102, registers 104, cache 106, and memory 108. In operation, computation unit 102 uses registers 104 and cache 106 to retrieve data stored in memory 108. Typically, computation unit 102 is a microprocessor, such as a CPU or GPU, capable of performing various computational procedures including matrix multiplication on input matrices to obtain a resultant matrix, e.g., by converting multiplications into additions and outputting the result into some internal register.

For example, a dot product that represents an output pixel of an image is typically generated by dot-multiplying individual matrix elements from two matrices to obtain partial results, which are then added to obtain the final dot product. A multiplication of individual matrix elements, i.e., a scalar multiplication, is typically performed on individual data elements by breaking up the dot multiplication into a series of individual sub-operations. As a result, partial products have to be stored and fetched from one or more of registers 104, cache 106, and memory 108 to complete a single arithmetic operation.

Computationally demanding applications, such as a convolution, oftentimes require a software function be embedded in computation unit 102 and used to convert convolution operations into alternate matrix-multiply operations. This is accomplished by rearranging and reformatting data into two matrices that then can be raw matrix-multiplied. However, there exists no mechanism to efficiently share or reuse data in scalar machine 100, such that data necessary to execute each scalar operation has to be re-stored and re-fetched from registers many times. The complexity and managerial overhead of these operations becomes significantly greater as the amount of image data subject to convolution operations increases.

The inability to reuse much of the data in scalar machine 100 coupled with the added and inefficient steps of storing and fetching intermediate results from registers 104, cache 106, and memory 108 to complete an arithmetic operation are only some of the shortcoming of existing systems, such as multiplier system 100.

Accordingly, what is needed are high-computational-throughput systems and methods that can perform matrix mathematical operations quickly and efficiently.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

DETAILED DESCRIPTION OF EMBODIMENTS

Figure 1:
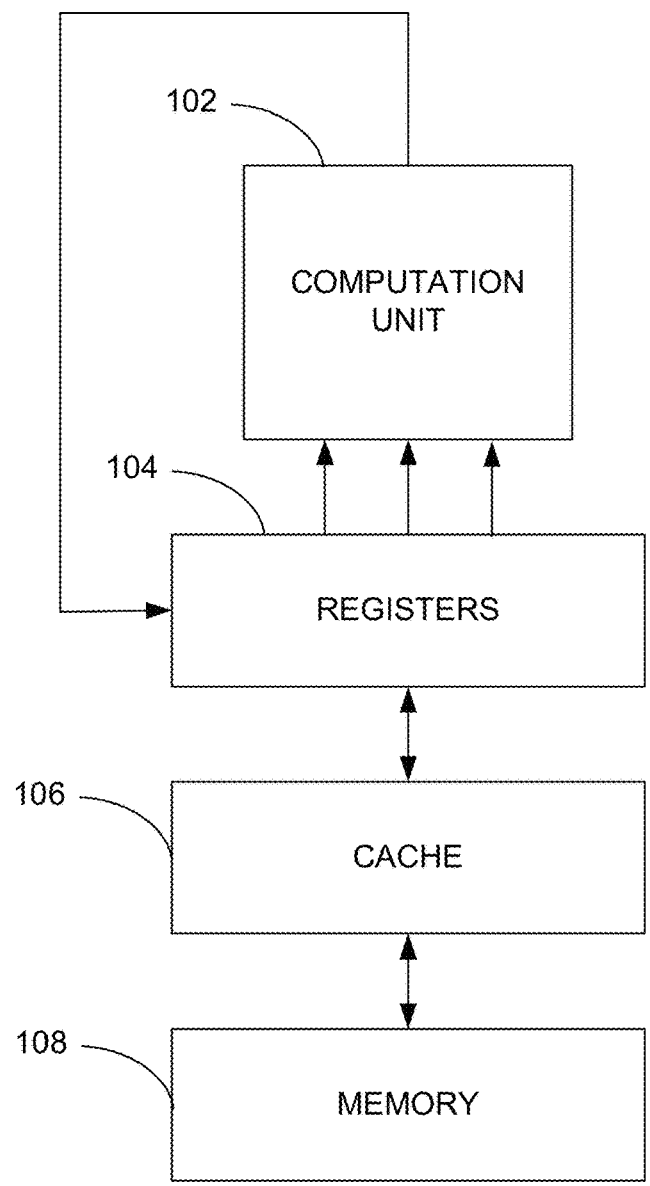
FIG. 1 shows an example of a conventional multiplier system.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof. Many components are be formed through interconnection of many subcomponents. Subcomponents may be selected that are logically different in operation from what is shown herein, where these logically different subcomponents can be combined in the aggregate with other subcomponents provide similar or identical functionality at the aggregated component level to that described herein (e.g., active high signals can be active low, AND gates replaced with inverted-input NOR gates, etc).

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists that follow are examples and not meant to be limited to the listed items and may include subsets or supersets of the items along with additional items. Any headings used herein are for organizational purposes only and shall not be used to limit the scope of the description or any claims. Each document mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Although embodiments herein are discussed mainly in the context of convolutions, one of skill in the art will appreciate that a deconvolution and other matrix operations can also be structured as a matrix-matrix type multiply operation and, thus, the principles of the present invention are equally applicable to deconvolutions. Furthermore, other types of mathematical operations may be implemented in accordance with various embodiments of this disclosure.

Figure 2:
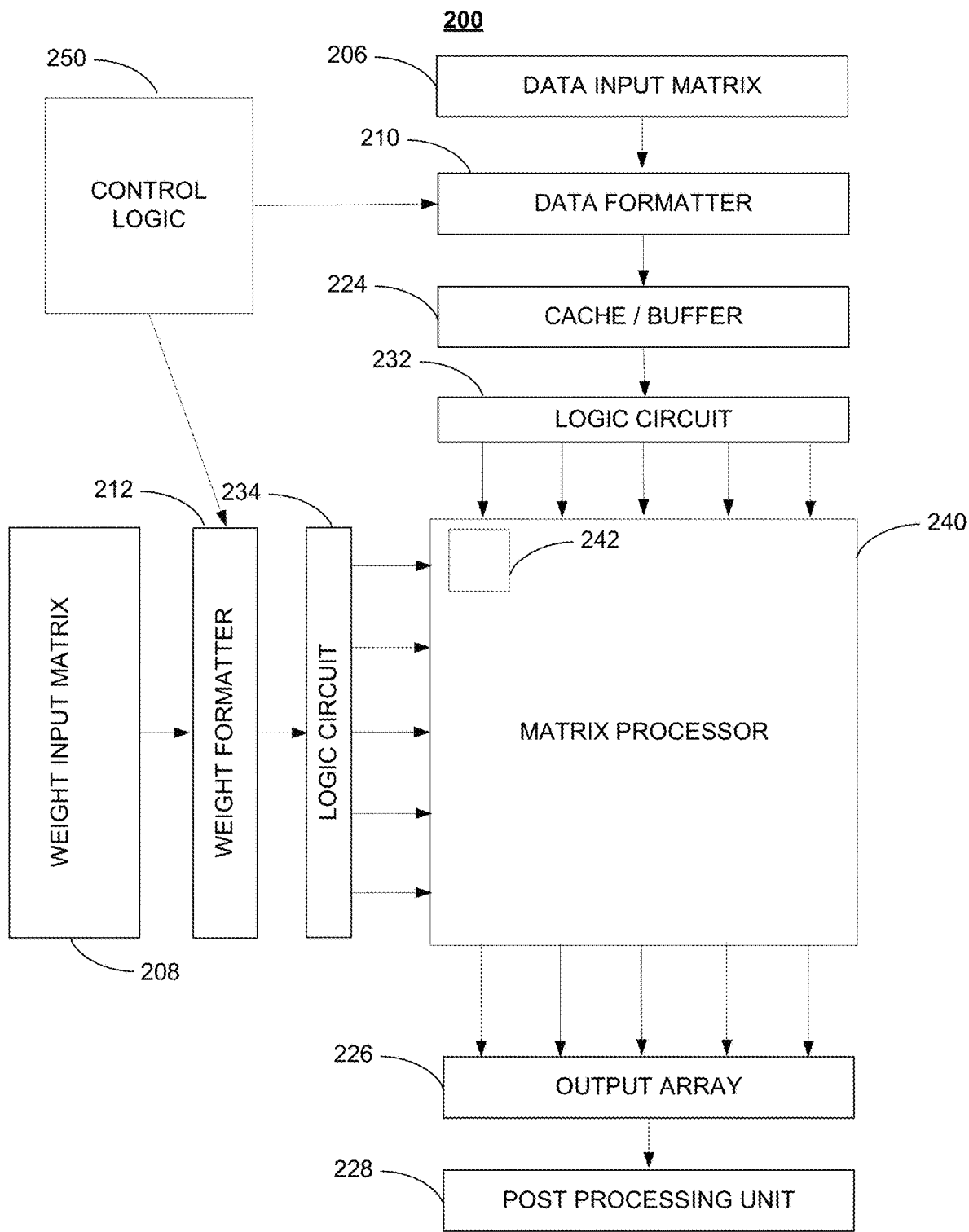
FIG. 2 illustrates and exemplary matrix processor architecture for performing arithmetic operations according to various embodiments of the present disclosure.

FIG. 2 illustrates an exemplary matrix processor architecture for performing arithmetic operations according to various embodiments of the present disclosure. System 200 comprises logic circuit 232 234, cache/buffer 224, data formatter 210, weight formatter 212, data input matrix 206, weight input matrix 208, matrix processor 240, output array 226, post processing units 228, and control logic 250. Matrix processor 240 comprises a plurality of sub-circuits 242 which contain Arithmetic Logic Units (ALUs), registers and, in some embodiments, encoders (such as booth encoders). Logic circuit 232 may be a circuit that represents N input operators and data registers. Logic circuit 234 may be circuitry that inputs M weight operands into matrix processor 240. Logic circuit 232 may be circuitry that input image data operands into matrix processor 240. Weight input matrix 208 and data input matrix 206 may be stored in various types of memory including SRAM devices. One skilled in the art will recognize that various types of operands may be input into the matrix processor 240.

In operation according to certain embodiments, system 200 accelerates convolution operations by reducing redundant operations within the systems and implementing hardware specific logic to perform certain mathematical operations across a large set of data and weights. This acceleration is a direct result of methods (and corresponding hardware components) that retrieve and input image data and weights to the matrix processor 240 as well as timing mathematical operations within the matrix processor 240 on a large scale.

In embodiments, formatters 210 212, which in example in FIG. 2 are implemented as in-line formatters. In certain embodiments, formatters 210 212 are discrete components and in other embodiments the formatters 210 212 are integrated together and/or with one or more other components. Each is implemented in hardware and converts a matrix to a vector on operands to be operated upon within the matrix processor 240. In other embodiments, formatters 210 212 are implemented in software, although this typically produces a loss in speed. Data formatter 210 converts two-dimensional or three-dimensional (e.g., a 3×3×3 cube) data comprising data input matrix 206 into a single vector or string that may be represented by a row or column, thereby, linearizing or vectorizing data input matrix 206. In detail, formatter 210 receives data input matrix 206 and prepares input data to be processed by matrix processor 240. In embodiments, this is accomplished by mapping parameters of the data input matrix 206 into a suitable format according to the hardware requirements of matrix processor 240 such that matrix processor 240 can efficiently perform a matrix multiply as part of a convolution calculation when generating output pixels.

As an example, assuming matrix processor 240 comprises 96 rows and 96 columns, data mapped into a 96×96 format would cause matrix processor 240 to be utilized to its full computational capacity and, thus, provide a preferred efficiency. In that case, formatter 210 should produce an output that is 96-columns wide. Similarly, formatter 212 should produce an output that is 96-rows wide based on the weight input matrix 208.

In embodiments, formatter 210 uses a number of multiplexers or switches to fetch some or all of data input matrix 206 and choose different elements therefrom in order to produce data that is then lined up according to the columns of matrix processor 240. In embodiments, the selection ensures that the appropriate data from data input matrix 206 is passed to each of the columns at defined clock cycles. In embodiments, if weights are static, they may be pre-formatted offline, stored in memory, fetched only once, and fed directly into matrix processor 240 in a modified, vectorized format without the use of formatter 212. In other embodiments, weights may be dynamically adjusted and fed into matrix processor 240 in accordance with various formatting and fetching operations. In embodiments, matrix processor 240 allows for column and row inputs of varying sizes. That is, matrix processor 240 is designed to compute NxM computations of arbitrary size.

In other embodiments, if the number of columns of the matrix processor 240 is limited (for example to N columns) such that the number of columns in the data input matrix 206 (for example X) is greater than the number of columns of the matrix processor 240 (i.e., X>N), then the control logic 250 may split the data input matrix 206 into multiple submatricies with each submatrix computed by a matrix processor 240. In such instances, each matrix processor 240 may be running in a different thread. For example, if data input matrix 206 consists of 192×96 data points, and the matrix processor has 96 columns and 96 rows (i.e., 96×96 computations may occur in one clock cycle), the control logic 250 may split the data input matrix 206 into two submatricies (such as the left half of the data input matrix 206 and the right half of the data input matrix 206). Each submatrix will consist of 96×96 data points. Each separately threaded matrix processor 240 can compute the output channels for the submatrix sent to it with results placed into the final output array 260, which must be large enough to hold the values from all channels (that is 192 values). More generally, data input matrix 206 may be split into any number of submatricies and sent to different matrix processors 240, each running in a separate thread. As with the output array 226, the data input matrix 206, data formatter 210, cache/buffer 224, logic circuit 232, and post processing unit 228 must similarly be able to accommodate the larger data.

In alternative embodiments, a CNN may be computed between multiple matrix processors 240 by having control logic 250 spliting the computations along the inner product. The segments of the inner product are computed, each in a different matrix processor 240, and then the input products added together to compute the output vector, which is then stored in output array 260.

Unlike common software implementations of formatting functions that are performed by a CPU or GPU to convert a convolution operation into a matrix-multiply by rearranging data to an alternate format that is suitable for a fast matrix multiplication, various hardware implementations of the present disclosure re-format data on the fly and make it available for execution, e.g., 96 pieces of data every cycle, in effect, allowing a very large number of elements of a matrix to be processed in parallel, thus efficiently mapping data to a matrix operation. In embodiments, for 2N fetched input data $2N^2$ compute data may be obtained in a single clock cycle. This architecture results in a meaningful improvement in processing speeds by effectively reducing the number of read or fetch operations employed in a typical processor architecture as well as providing a paralleled, efficient and synchronized process in performing a large number of mathematical operations across a plurality of data inputs.

In embodiments, to increase efficiency of matrix processor 240 that may have any arbitrary number of columns and rows, formatter 212 214 may reformat different shapes of input matrices data into the columns and rows suitable for matrix processor 240. In embodiments, formatting is performed dynamically to accommodate processing of matrices having different input sizes. In embodiments, the reformatted matrixes comprising input channels are fed into cache/buffer 224.

Cache/Buffer 224 may fetch data from data input matrix 206 only 1/k times as various pieces of data may be reused, where k is the convolution kernel width. For example, for any given cycle, once a row is fetched, certain columns will have access to all the data in that row. In embodiments, cache/buffer 224 may be a local buffer that stores a local copy of data that may be reused by a convolution without having to re-access and read data from SRAM.

Once matrix processor 240 has completed a computation, a set of result may be shifted, e.g., from the accumulators in the bottom row of matrix processor 240, e.g., to output flip-flops (not shown) that effectively form a shift register that receive a dot product. In embodiments, pulling or shifting results into output array 226, e.g., one per clock cycle, from a row that corresponds to an output channel may be accomplished by a state machine (not shown). The state machine may perform additional operations on the output channel, for example, prior to sending data to SRAM and/or post processing unit 228. The internal operation of matrix processor 240 will be described in more detail below.

In embodiments, matrix processor 240 comprises shadow resisters that enable parallel processing by storing a copy of the results that are passed through matrix processor 240 to output array 226. In embodiments, moving an operation result from output register to shadow register involves loading the next set of values into the ALUs.

Once an accumulation has completed, a convolution may commence and accumulation may start over before all of the data of a prior convolution is output to output array 226. As a result, in every clock cycle, the data in matrix processor 240 may move down by one row, such that for each cycle the last row may be output to output array 226. In effect, this mode of operation ensures that a new calculation may be made in each consecutive cycle without any interruptions and independent of additional processing operations, such as storing data in SRAM, etc.

Post processing unit 228 may comprise or interact with a number of devices (not shown), such as a hardware-accelerated pooling unit, a DRAM that may be part of a direct memory access ("DMA") that retrieves data from memory and stores data (e.g., weights and results) in SRAM, and the like. The devices may be partially or entirely controlled by control logic 250, which may also manage formatters 210 212 and other components within system 200.

Not shown in FIG. 2 are auxiliary devices that perform management functions, such as a sequencer that generates addresses for reading the data, writes the results, and keeps track of where system 200 is in the convolution in order to calculate from where to get and how to execute the data that will be used in a subsequent step of the convolution.

In certain embodiments, weight input matrix 208 is physically split and drives weights from two different sides of matrix processor 240, such that the two-dimensional array is split into two regions (e.g., a left-hand side and a right-hand side) that each receive a portion of the data in weight input matrix 208. Such an implementation reduces data latency by taking advantage of the fact that weights are known. In embodiments, in order to reduce peak power consumption, the timing of operations may be chosen such that multiplications of weight and data are spread out over a certain number of cycles. This efficient timing of operations results in a reduction of energy consuming steps including a decrease in the number of read operations performed by the matrix processor and improving the efficiency of data movement within the matrix (e.g., between sub-circuits).

In embodiments, a state machine (not shown) that is configured to identify redundant data may be employed. Identified redundant data may be reused across columns, such that the data does not need to be re-fetched. The state machine may be configured to determine how and where to shift data that is to be executed, e.g., based on inputs related to image size, filter size, stride, number of channels, and similar parameters.

In embodiments, a booth encoder is shared across a number of elements in the multiplication architecture of matrix processor 240. The booth encoder may be any booth encoder known in the art and may be used to multiply two numbers and encode one of the two numbers, e.g., from an 8-bit value to a 12-bit or any other value that makes multiplication operations easier on the multiplier logic and, thus, faster. In embodiments, the booth encoder may be applied in parallel across an entire row so as to share the same encoded, alternate weight value across all columns. By loading an operand across all columns, a multiplication may be performed in a single clock cycle across an entire row. The cost for leveraging re-encoding to share the same data (e.g., weights) across for N computational elements is thus paid only once for each column (or row). In comparison, in existing computing architectures, every single scalar would require a booth encoder for every single multiplication operation.

Figure 3:
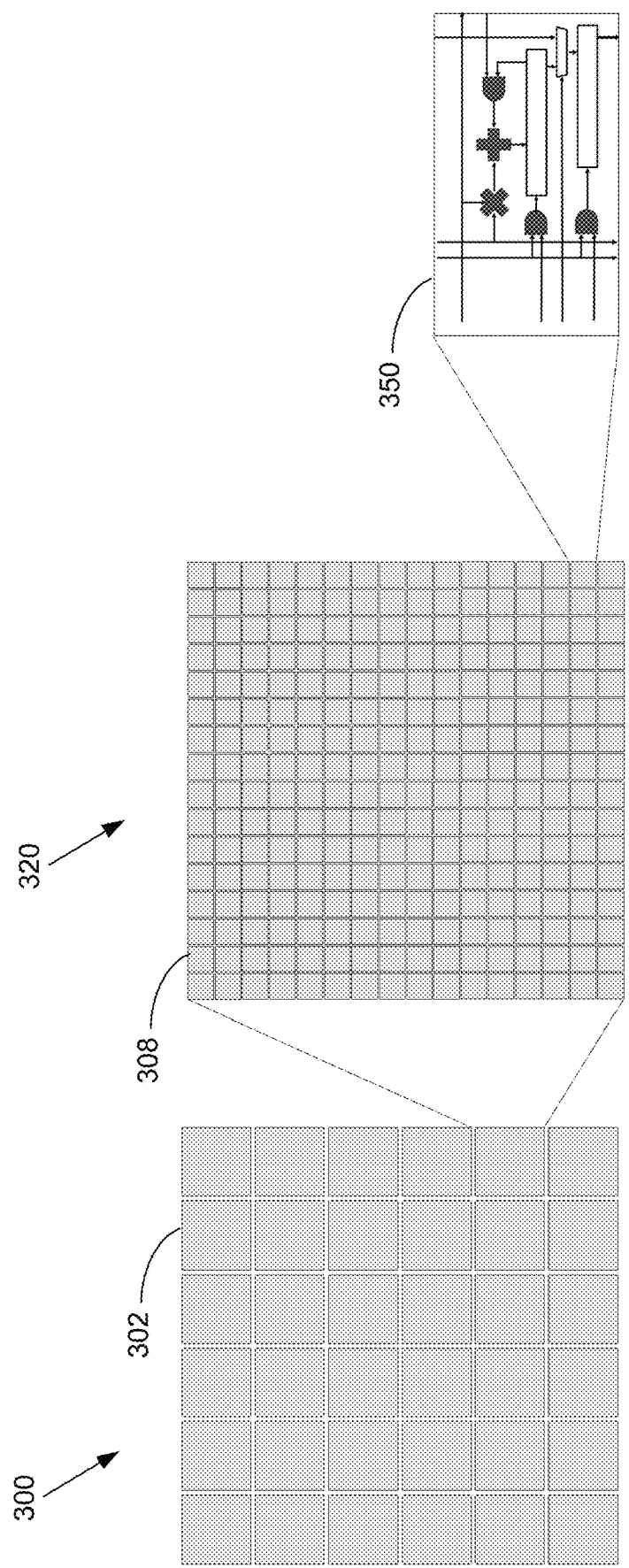
FIG. 3 illustrates details of an exemplary configuration of the matrix processor architecture shown in FIG. 2.

FIG. 3 illustrates details of an exemplary configuration of the matrix processor architecture shown in FIG. 2. In embodiments, matrix processor 300 may accommodate a predetermined vector length on each axis. As depicted in FIG. 3, matrix processor 300 may comprise an array of 6×6 tiles 302 that are arranged in a matrix format. Each tile 302 may comprise a matrix 320 that, in turn, comprises sub-circuits circuits 350. As discussed in detail below with reference to FIG. 4, each sub-circuit circuit 350 may be a cell capable of performing arithmetic operations. In embodiments, sub-circuit circuit 350 performs simultaneously multiplication, accumulation, and shift operations.

In embodiments, arithmetic operations are parallelized by utilizing multiple rows and columns of matrix processor 300 to generate an N×N tile output. For example, a given row size of 96 and a corresponding column size of 96 facilitate an output of 2*9216 mathematical calculations. In other embodiments, the number of rows and columns may be different. That is, there may be N rows and M columns and an N×M tile output may be generated. For example, for a row size of 96 and a corresponding column size of 192, an output of 2*18,432 calculations is generated in a single clock cycle.

Figure 4:
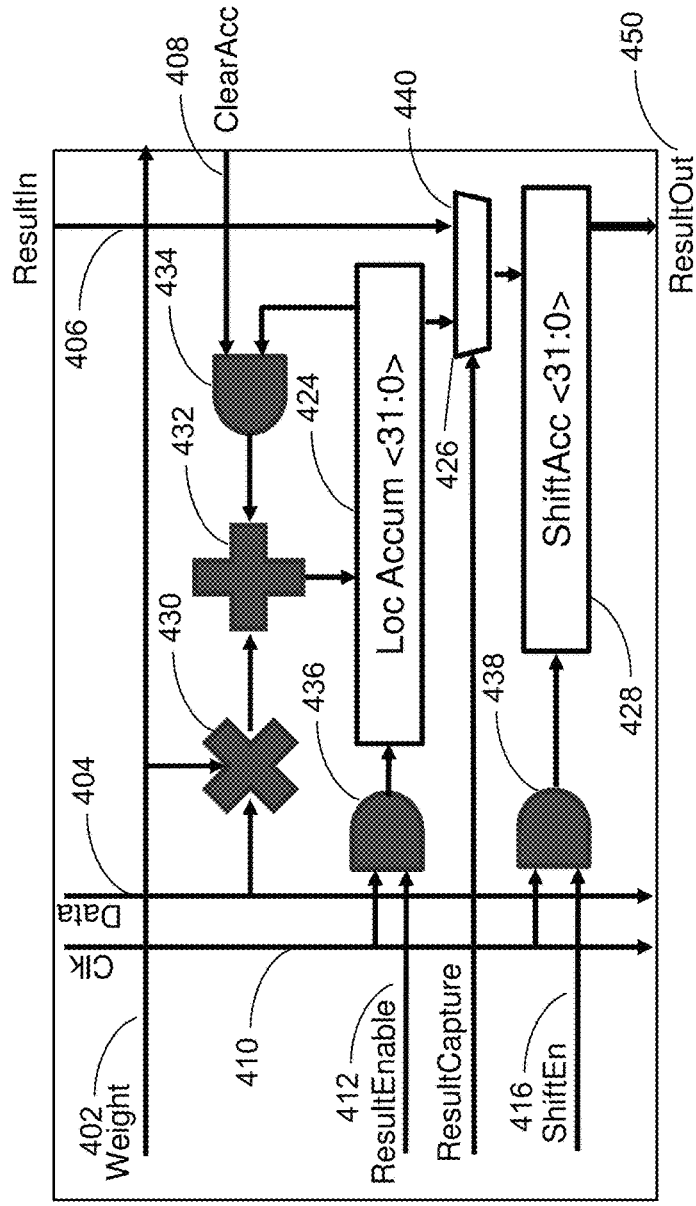
FIG. 4 illustrates an exemplary multiply-and-add circuit implementation of the logic circuit shown in FIG. 3.

FIG. 4 illustrates an exemplary multiply-and-add circuit implementation of the sub-circuit shown in FIG. 3. As depicted in FIG. 4, multiply-and-add circuit 400 comprises multiplier 430, adder 432, logic 434 436 438, accumulator 424, shadow register 428, and output register 440. In embodiments, accumulator 424 may be implemented as an accumulation register.

In embodiments, accumulator 424 may comprise a set of ALUs that comprise registers and shadow register 428 that may be configured to receive the outputs of the ALUs.

In operation, multiplier 430 receives and multiplies weights 402 and data 404 to generate products therefrom. Each product may be provided to adder 432 that, in response to receiving the product from multiplier 430, adds the product to the current value of the accumulator 424.

In embodiments, accumulator 424 generates an accumulated value that is stored, e.g., in output register 440. The accumulated value is the result of a convolution and, as mentioned with reference to FIG. 2, may correspond to the dot product of two formatted matrices.

In embodiments, a copy of the result in output register 440 may be provided to shadow register 428, which may output result 450, such that accumulator 424 can be accessed again to commence new calculations. In embodiments, multiply-and-add circuit 400 in FIG. 4 may perform a multiplication, an addition operation, and a shift operation at the same time, i.e., within a single cycle, thereby doubling the total number of operations that occur each cycle.

In embodiments, ClearAcc signal 408 clears the contents of accumulator 424, e.g., when multiplier 430 performs a multiply operation, such that accumulation operations can start over. In embodiments, ResultEnable signal 412 is activated in response to a determination that data 404 is valid. It is understood that accumulator 424 may accumulate and save data, accumulate and clear data, or just clear data.

In embodiments, results are moved from output register 440 to shadow register 428 in a single clock cycle, i.e., without the need of intermediate execute and save operations.

Figure 5:
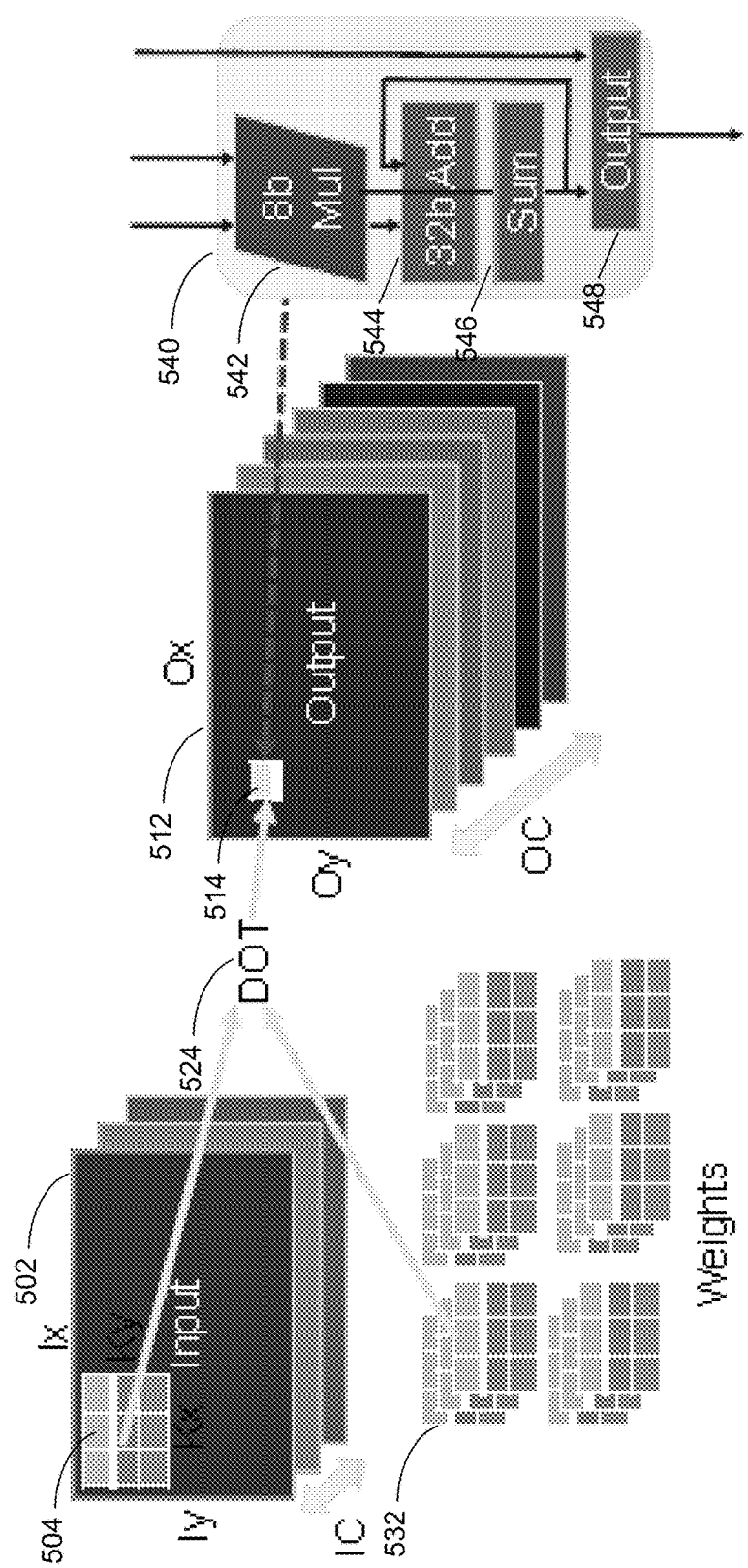
FIG. 5 illustrates an exemplary convolution operation according to various embodiments of the present disclosure.

FIG. 5 illustrates an exemplary convolution operation according to various embodiments of the present disclosure. Convolution 500 comprises input channels IC of input image 502, weights 532, dot product 514, output channels OC, and accumulator 540.

In embodiments, convolution operation 500 applies individual filters (i.e., weights) 532 to input image 502, e.g., to detect small features within input image 502. By analyzing a sequence of different features in a different order, macro features may then be identified in input image 502. In other embodiments, input 502 is non-image data. For example, input 502 may be non-image sensor data, such as ultrasonic, radar, LIDAR, or other sensor data. Input 502 may also be general mathematical computations or any other types of data known to one of skill in the art.

Convolution 500 may use a different set of weights 532 for each input channel IC, as each input channel IC may contain a different set of information, and each weight matrix 532 may be designed to help identify a different feature. In embodiments, convolution 500 multiplies a rectangular input matrix 504 with a rectangular weight matrix 532 to obtain partial dot products. The partial dot products may then summed by adder 546 in order to generate an accumulated dot product 514 (i.e., an integer) that represents an output pixel 514 in the output image.

In embodiments, each pixel in output channel OC is generated by multiplier 542 and adder 544. In embodiments, the value of the partial dot products correspond to the application of weight matrix 532 in its entirety to area 504 of the input image 502. In other words, each weight 532 is dot multiplied by multiplier 542 with area 504 to produce a partial dot product, then the partial dot products are accumulated in accumulator 540 to generate an accumulated output that represents the convolution.

One or more input channels IC, e.g., one for each color (e.g., RGB) may be used. For example, each convolution may use weights 532 that represent three different matrices, one for each color. Each output channel OC 512 may be generated using a different filter or weight 532 that represents a different feature in input data 502. The number of output channels may depend on the number of features. The number of convolutions is equal to the number of output channels OC times the number of input channels IC, and each convolution may have N convolutions for each input channel IC. One skilled in the art will recognize that the number and type of input channels may vary and may include color and/or clear inputs.

As depicted in FIG. 5, input matrix 504 is a Kx×Ky (i.e., 3×3) matrix that may be combined with a 3×3 weight matrix 532 across 3 input channels, i.e., 3×3×IC, such that the depths match and produce a single element, dot product 514, in the output plane. Each dot product 514 in output channel 512 is the result of a dot multiplication.

Figure 6:
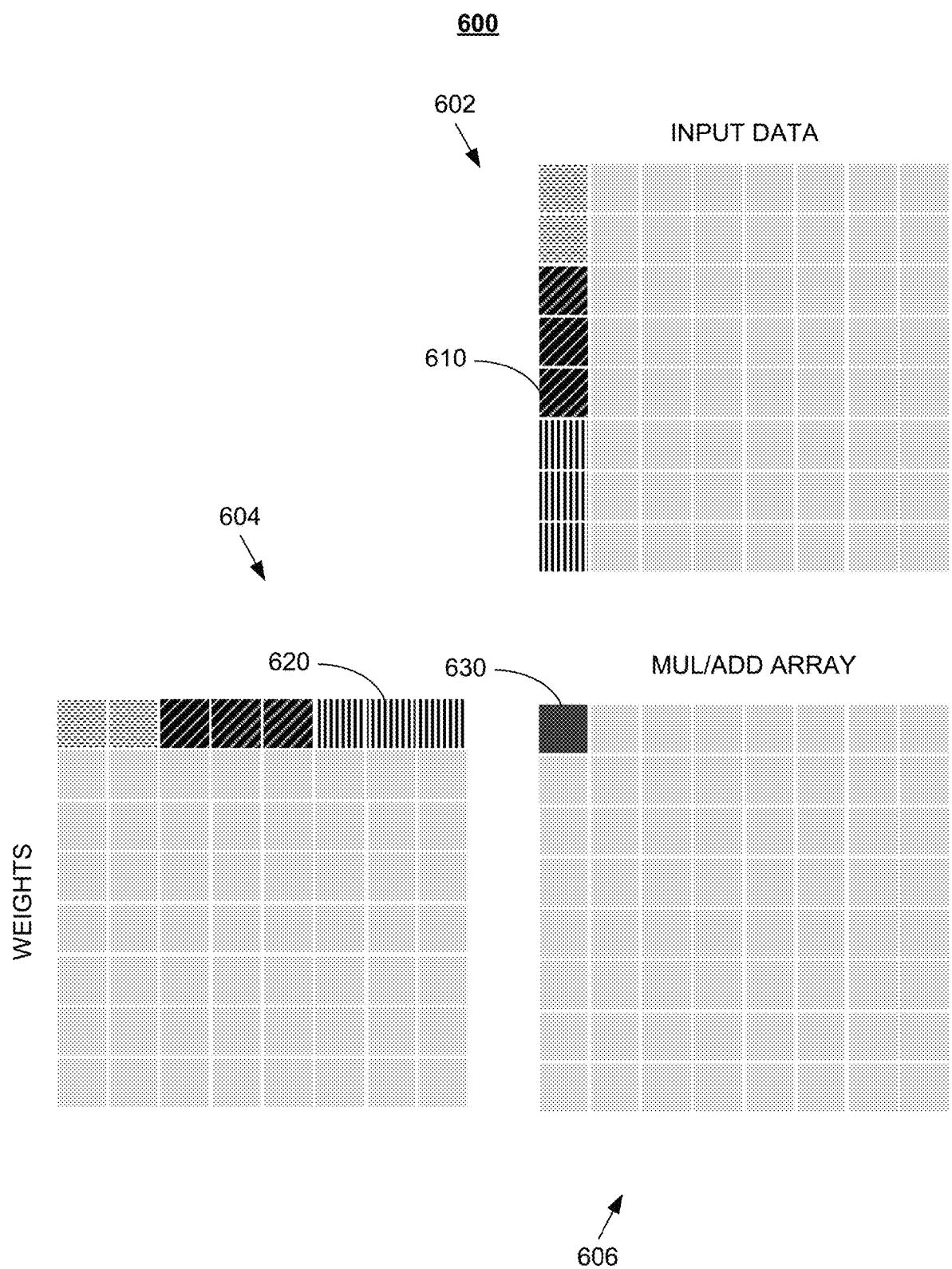
FIG. 6 through FIG. 8 illustrate details of an exemplary convolution operation according to various embodiments of the present disclosure.
Figure 7:
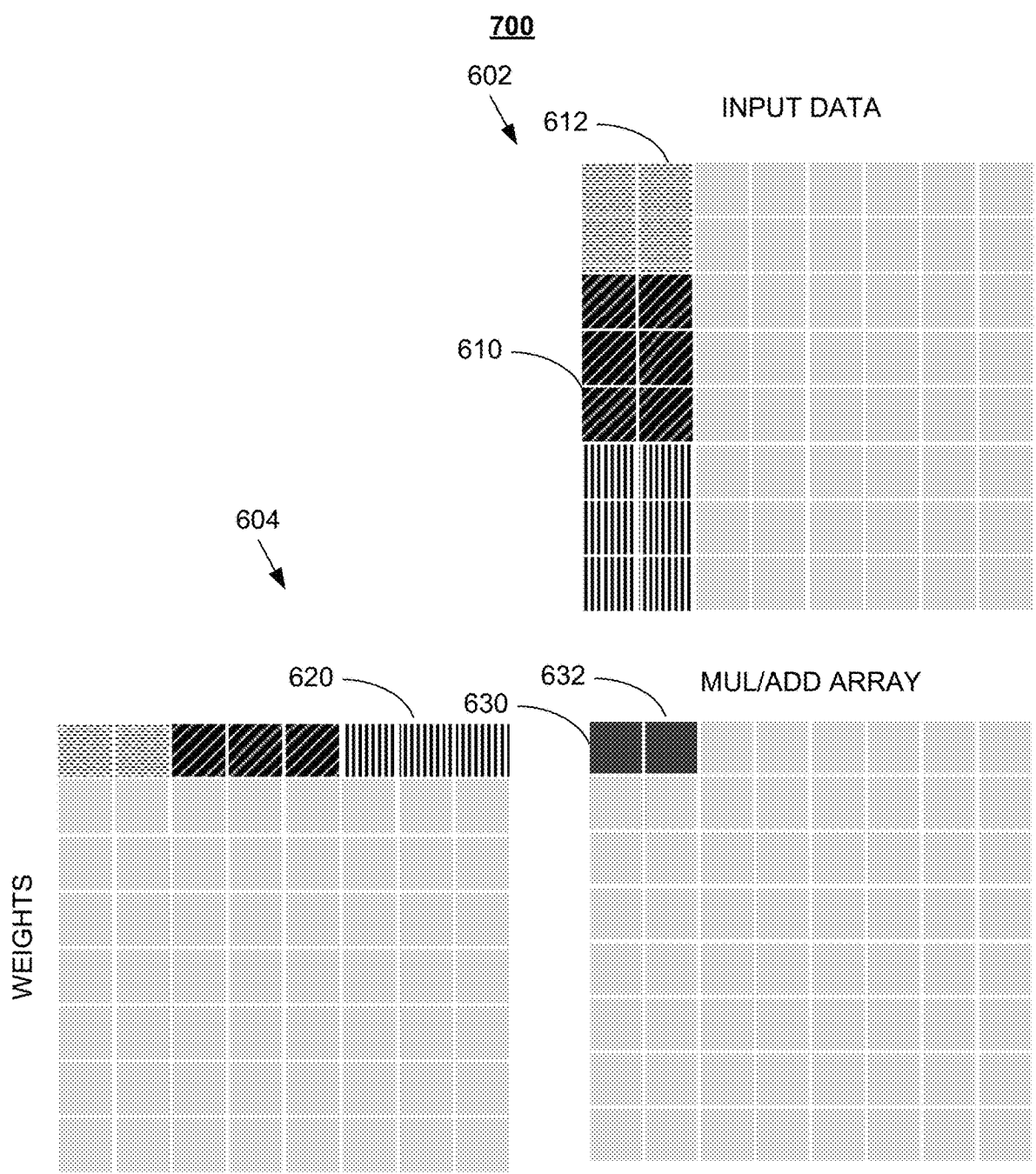
Figure 8:
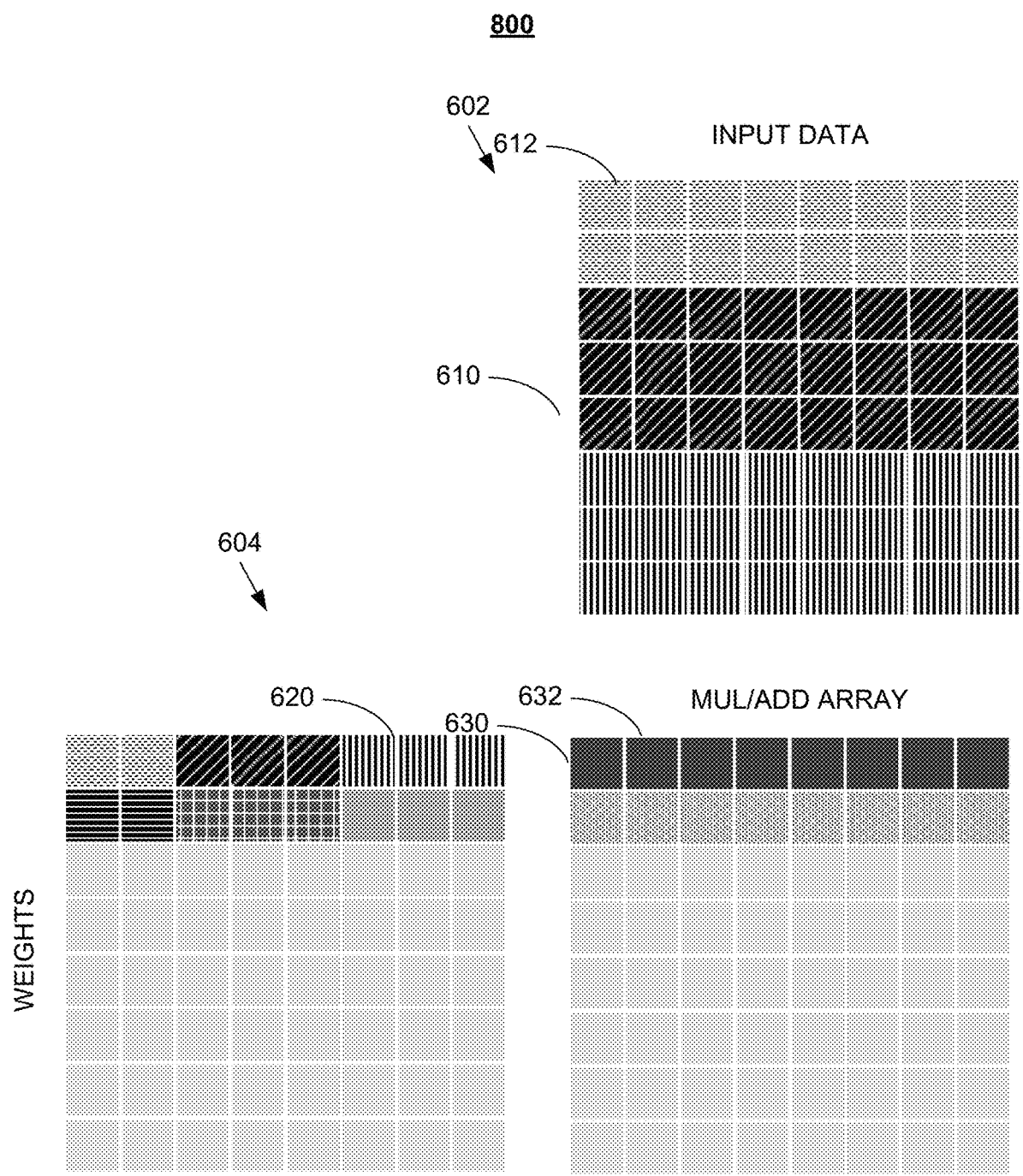

FIG. 6 through FIG. 8 illustrate details of an exemplary convolution operation according to various embodiments of the present disclosure. Convolution 600 comprises input data matrix 602, weight data matrix 604, array 606, and dot product 630. In embodiments, array 606 is a matrix processor architecture as shown in FIG. 2 and FIG. 3.

Input data matrix 602 in FIG. 6 comprises column 610 that, in embodiments, may be obtained by linearizing an input matrix, such as rectangular input matrix 504 shown in FIG. 5, to obtain a vectorized form of the input matrix. Similarly, weight data matrix 604 comprises row 620 that may be a vectorized form of a weight matrix, such as rectangular weight matrix 532 in FIG. 5. As an example, a 3×3 input matrix and 3 input channels may be re-formatted into a vector that comprises 3×3×3=27 elements from which a 27-element column 610 may be produced for use in input data matrix 602. Conversely, a 3×3 weight matrix for the same 3 input channels may be used to generate a 27-element row 620 for use in weight data matrix 604. One skilled in the art will recognize that the sizes of input matrices and number of input channels may vary across different applications.

In embodiments, the input channels and input weights drawn as rectangles in FIG. 5 are reformatted, e.g., by the formatter discussed with reference to FIG. 2, into a vector formats (e.g., vectors having 96 elements) that are provided to a matrix multiplier/processor (denoted as element 240 FIG. 2), such that a 96×96 element dot product operation can be performed in parallel. In detail, input data 504 and input weights 532 shown in FIG. 5 as rectangles for each input channel are reformatted into vector formats.

In embodiments, the resulting vector formats, illustrated in FIG. 6 as input data 602 and input weights 604 (e.g., each having comprising 96 elements) are provided to matrix processor or matrix multiplier 240 that performs a 96×96 element dot product operation in parallel. In embodiments, in the calculation of output channels, the same output pixels are produced using the same set of input data but different set of weights (i.e., filters), such that by reading the input data once many output channels can be generated at once. As stated above, it is understood that the number of input and output channels may be arbitrarily chosen.

It is further understood that input data matrix 602, weight data matrix 604, and array 606 may have different numbers of columns and rows as those depicted in FIG. 6. In particular, the shapes of input data matrix 602 and weight data matrix 604 may be formatted such as to accommodate the columns and rows of any arbitrate configuration of array 606. In addition, in circumstances in which weight data matrix 604 is known then row 620 may be generated and stored in a vectorized format without the use of a formatter.

In embodiments, dot product 630 in FIG. 6 is generated by dot-multiplying a vector corresponding to column 610 with a vector corresponding to row 620. In embodiments, as shown in FIG. 7, the next dot product 632 may be obtained by dot-multiplying a vector corresponding to column 612 with the vector corresponding to row 620. As those of skill in the art will recognize, once all dot products in the first row of array 606 are filled, the dot product of the second row of array 606 may be calculated by dot-multiplying the elements in first column 610 of input data matrix 602 with the second row of weight data matrix 604, etc.

It is important to note that FIG. 6 through FIG. 8 merely serve illustrative purposes and that the abovementioned dot-multiplications may be simultaneously performed to generate a one-shot matrix-matrix multiply operation.

Figure 9:
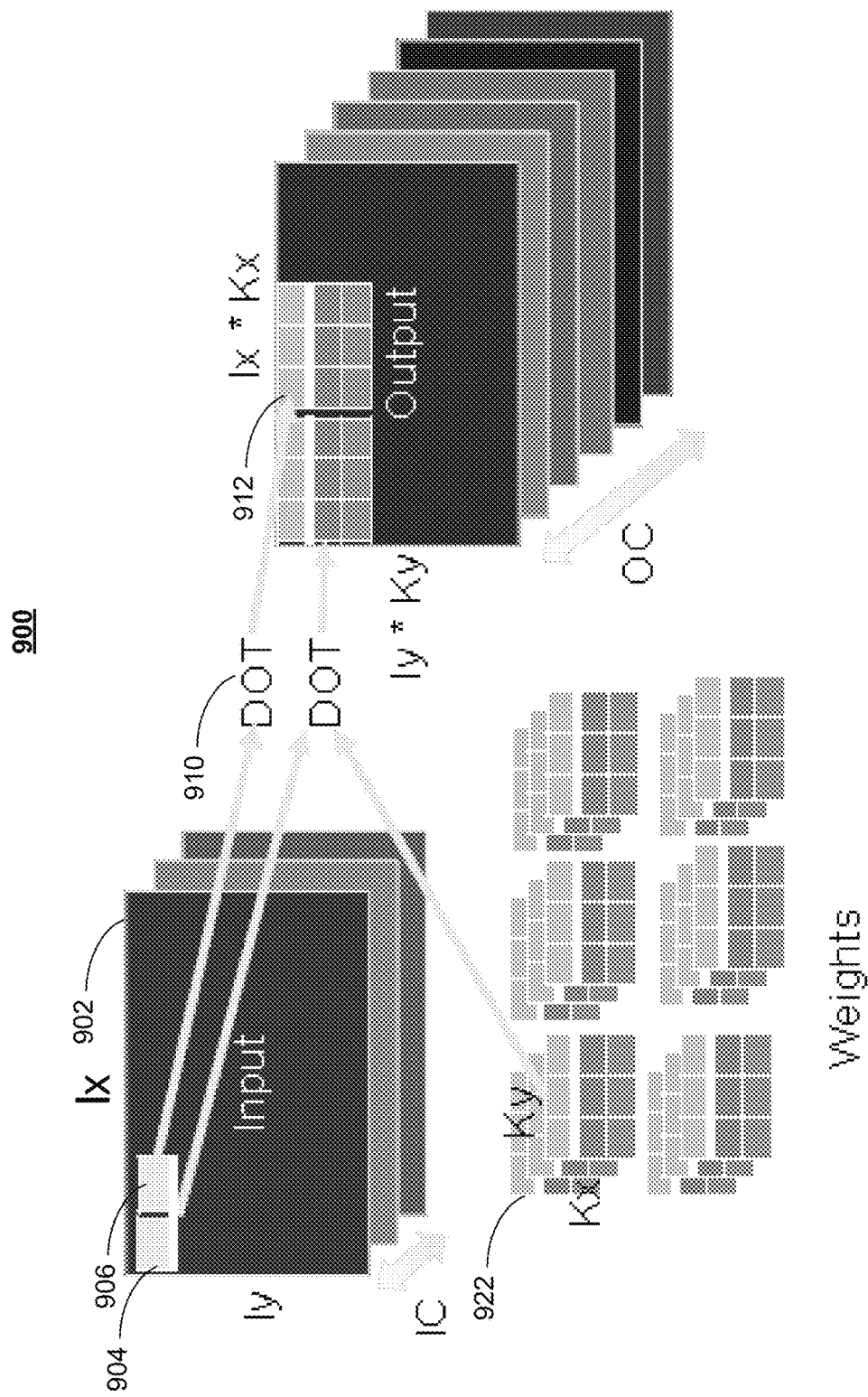
FIG. 9 illustrates an exemplary deconvolution operation according to various embodiments of the present disclosure.

FIG. 9 illustrates an exemplary deconvolution operation according to various embodiments of the present disclosure. Deconvolution system 900 comprises input channels IC of input image 902, weights 922, dot product 904 906, and output channels OC. A person of skill in the art will recognize that, the deconvolution operation 900 is, in effect, is a mathematical transposition (approximately the inverse) of the convolution operation, for example, the convolution shown in FIG. 5. One of skill in the art will further recognize that a neural network may be used to learn deconvolution operation 900 by applying procedures similar to those used for ordinary convolutional neural networks. For purposes of brevity, a description or functions of components similar to those in FIG. 5 is not repeated here.

In embodiments, deconvolution operation 900 in FIG. 9 reassembles matrices 912 by deconstructing dot product 904 906 using weights 922. As with a convolution operation, deconvolution 900 may use a different set of weights 922 for each input channel IC. In embodiments, deconvolution 900 may be advantageously applied to an image to perform image deconvolution, for example to improve robustness against artifacts. Other applications may include analysis and restoration of image data, and the like.

Figure 10:
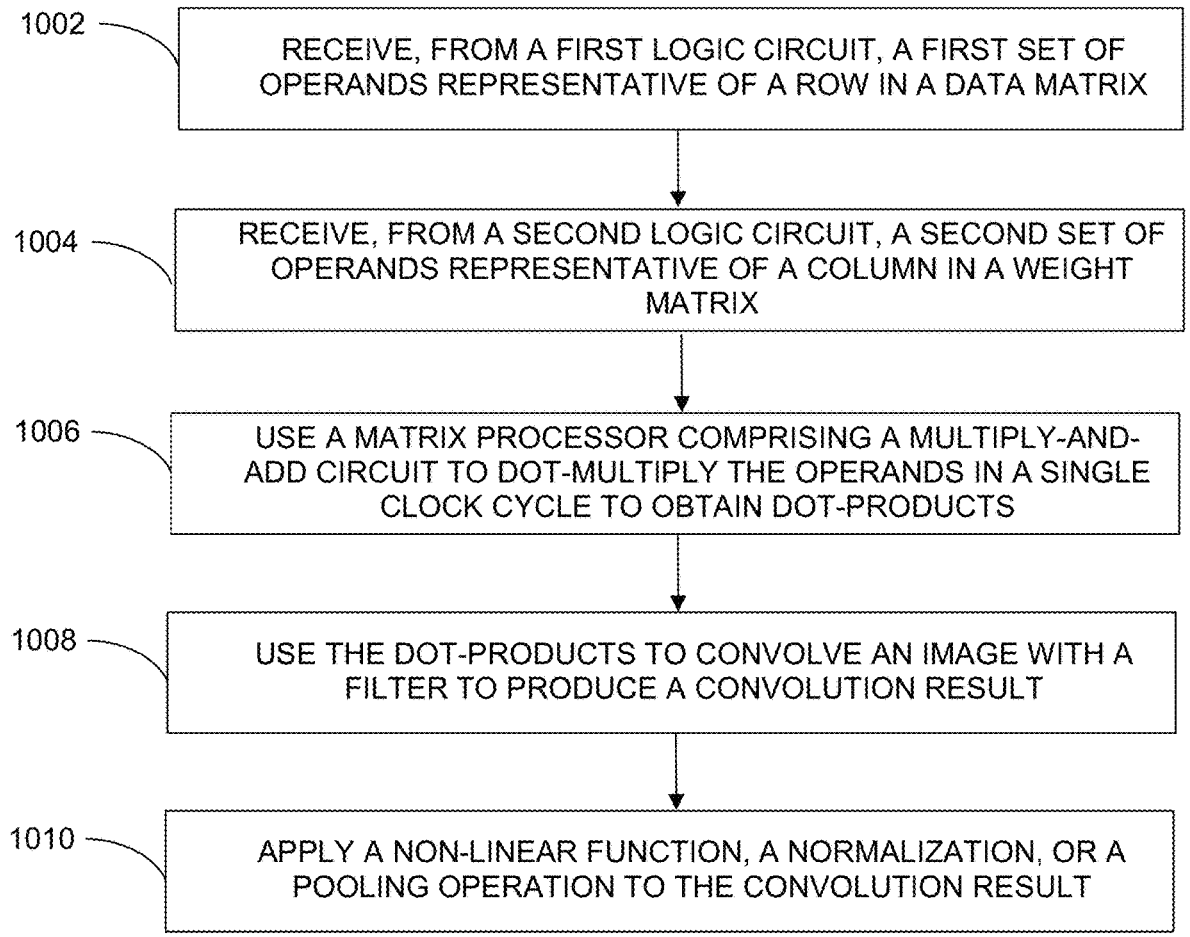
FIG. 10 illustrates a process for performing arithmetic operations to make convolutional neural networks faster, according to various embodiments of the present disclosure.

FIG. 10 illustrates a process for performing arithmetic operations to accelerate convolutional neural networks according to various embodiments of the present disclosure.

Process 1000 for performing arithmetic operations begins at step 1002 when a first set of operands that may be representative of a row in a data matrix is received from a first logic circuit. This first set of operands may be vectorized such that the operands are aligned with inputs into a matrix processor. In certain embodiments, the size of the vectorized operands is directly related to the number of inputs into a matrix processor along on axis.

At step 1004, a second set of operands that may be representative of a column in a weight matrix is received from a second logic circuit. This second set of operands may be vectorized such that the operands are aligned within corresponding inputs into the matrix processor. In certain embodiments, the size of the vectorized operands is directly related to the number of inputs into the matrix process along a different axis.

At step 1006, the first set of operands is dot-multiplied with the second set of operands to obtain one or more dot-products. In certain embodiments, this set operation across the sets of operands is performed in a single clock cycle.

At step 1008, the dot-products may be used to convolve an image with a filter to produce a convolution result.

At step 1010, the convolution result is further processed to enhance the image output. This further processing may occur using a non-linear function, a normalization operation or a pooling operation.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims below may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

The invention claimed is:

1. A matrix processor comprising:
a first input circuit configured to receive sensor data;
a second input circuit configured to receive one or more filters of a plurality of filters; and
a plurality of sub-circuits arranged as a matrix and configured to receive the sensor data and filters, wherein each sub-circuit comprises an arithmetic logic unit, and wherein the sub-circuits are configured to convolve the sensor data and filters,
wherein to convolve the sensor data and filters the sub-circuits are configured to sequentially convolve, via the sub-circuits, individual subsets of the sensor data with the one or more filters, wherein one or more of the remaining filters are subsequently received for convolution,
wherein a last row of the sub-circuits arranged as the matrix is configured to shift output to an output array, and wherein the output comprises individual subsets of the sensor data convolved with a respective filter of the plurality of filters.

2. The matrix processor of claim 1, wherein the sensor data comprises image data, LIDAR data, ultrasonic data, or radar data.

3. The matrix processor of claim 1, wherein the receive sensor data comprises reformatted operands representing linearized sensor data.

4. The matrix processor of claim 1, wherein one or more of the sub-circuits further comprise encoders.

5. The matrix processor of claim 4, wherein at least a portion of the sub-circuits share a particular encoder, and wherein the particular encoder is a booth encoder.

6. The matrix processor of claim 1, wherein the matrix processor implements a state machine configured to identify redundant data.

7. The matrix processor of claim 6, wherein identifying redundant data is based on input comprising respective sizes associated with individual filters of the plurality of filters and/or individual strides of one or more strides.

8. The matrix processor of claim 1, wherein convolving a first subset comprises:
determining a convolution of the first subset with one or more of the filters, wherein one or more remaining subsets are sequentially convolved with the one or more of the remaining filters.

9. The matrix processor of claim 1, wherein the matrix processor comprises an array of tiles, and wherein the tiles comprise respective subsets of the sub-circuits.

10. A system comprising:
a first logic circuit configured to format sensor data and provide the formatted sensor data to a matrix processor;
a second logic circuit configured to provide one or more filters of a plurality of filters to the matrix processor; and
the matrix processor comprising a plurality of sub-circuits arranged as a matrix, the sub-circuits being configured to sequentially convolve individual subsets of the sensor data with the one or more filters, wherein one or more of the remaining filters are subsequently received for convolution,
wherein a last row of the sub-circuits arranged as the matrix is configured to shift output to an output array, and wherein the output comprises individual subsets of the sensor data convolved with a respective filter of the plurality of filters.

11. The system of claim 10, wherein sequentially convolving individual subsets of the sensor data comprises: determining a convolution of a first subset of the sensor data with one or more of the filters, wherein one or more of the remaining filters of the plurality of filters are received for convolution with the first subset.

12. The system of claim 10, wherein the first logic circuit comprises a plurality of data registers that store portions of the sensor data, the plurality of data registers having a first width corresponding to a size of an input region obtained from sensor data.

13. The system of claim 12, wherein the input region corresponds to an individual subset of the sensor data.

14. The system of claim 10, wherein the system comprises a data formatter configured to linearize sensor data into a plurality of vectors, each vector representing a respective subset of the sensor data.

15. A method implemented by a matrix processor, the method comprising:
receiving, from a first logic circuit, sensor data comprising a plurality of subsets;
receiving, from a second logic circuit, one or more filters of a plurality of filters;
using a plurality of sub-circuits of the matrix processor to sequentially convolve individual subsets with the one or more filters, wherein the sub-circuits are arranged as a matrix, wherein one or more of the remaining filters are subsequently received for sequential convolution with the individual subsets; and
outputting, to an output array, output from a last row of the sub-circuits arranged as the matrix, wherein the output comprises individual subsets of the sensor data convolved with a respective filter of the plurality of filters.

16. The method of claim 15, wherein subsequent to convolving a first subset with the one or more filters, a second subset is convolved with the one or more filters.

17. The method of claim 15, wherein the matrix processor sequentially receives a respective one or more filters of the plurality of filters.

18. The matrix processor of claim 1, wherein the output corresponds to a particular output channel of a plurality of output channels, and wherein the plurality of filters is associated with the particular output channel.

19. The system of claim 10, wherein the output corresponds to a particular output channel of a plurality of output channels, and wherein the plurality of filters is associated with the particular output channel.

20. The method of claim 15, wherein the output corresponds to a particular output channel of a plurality of output channels, and wherein the plurality of filters is associated with the particular output channel.

* * * * *